US012263888B2

(12) United States Patent
Haagaard et al.

(10) Patent No.: US 12,263,888 B2
(45) Date of Patent: Apr. 1, 2025

(54) CHASSIS FOR AN AUTONOMOUS MOBILE ROBOT

(71) Applicant: MOBILE INDUSTRIAL ROBOTS A/S, Odense S (DK)

(72) Inventors: Oliver Haagaard, Odense (DK); Mikkel Bjergskov Nielsen, Odense NØ (DK); Jonathan Lindskov Naundrup-Jensen, Odense C (DK); Niels Jul Jacobsen, Svendborg (DK)

(73) Assignee: Mobile Industrial Robots A/S, Odense SOE (DK)

( * ) Notice: Subject to any disclaimer, the term of this patent is extended or adjusted under 35 U.S.C. 154(b) by 141 days.

(21) Appl. No.: 17/791,602

(22) PCT Filed: Dec. 28, 2020

(86) PCT No.: PCT/EP2020/087923
§ 371 (c)(1),
(2) Date: Jul. 8, 2022

(87) PCT Pub. No.: WO2021/140039
PCT Pub. Date: Jul. 15, 2021

(65) Prior Publication Data
US 2023/0043531 A1    Feb. 9, 2023

(30) Foreign Application Priority Data
Jan. 9, 2020    (EP) .................... 20151039

(51) Int. Cl.
*B62D 21/18*    (2006.01)
*B25J 9/00*    (2006.01)
*B62D 29/04*    (2006.01)

(52) U.S. Cl.
CPC ............ *B62D 21/18* (2013.01); *B25J 9/0009* (2013.01); *B62D 29/041* (2013.01)

(58) Field of Classification Search
CPC ...... B26D 21/18; B25J 9/0009; B62D 29/041; B62B 3/002; B62B 3/1444; B62B 3/1472;
(Continued)

(56) References Cited

U.S. PATENT DOCUMENTS

2004/0093650 A1    5/2004    Martins et al.
2010/0139995 A1*   6/2010    Rudakevych ......... B62D 55/06
                                                            180/9.32
(Continued)

FOREIGN PATENT DOCUMENTS

CN    107235092 A    10/2017
CN    206691208 U    12/2017
(Continued)

OTHER PUBLICATIONS

International Search Report for PCT Application No. PCT/EP2020/087923, issued Apr. 13, 2021, (4 pages).
(Continued)

*Primary Examiner* — Daniel J Colilla
(74) *Attorney, Agent, or Firm* — ArentFox Schiff LLP

(57) ABSTRACT

A chassis for an autonomous mobile robot comprises a moulded frame having a stable support for any payload or additional machinery loaded on top of the mobile robot, while ensuring a rigidity of the chassis which again ensures that the supporting elements for the sensors are kept in a stable position relative to each other. The chassis has several separated compartments for EEE placement. These EEE compartments are accessible from the sides and ends of the mobile robot by removing detachable cover parts. A removable top cover is mounted on top of the moulded frame providing a top covering for central inside compartment and outside side compartments. Side covers and end covers are provided for outside compartments and are removable.

15 Claims, 4 Drawing Sheets

(58) Field of Classification Search
CPC .... B62B 2205/32; B62B 3/005; A63H 17/262
USPC ............... D12/159; D6/677.1, 574, 556
See application file for complete search history.

(56) References Cited

U.S. PATENT DOCUMENTS

| | | | |
|---|---|---|---|
| 2012/0023887 A1 | 2/2012 | Messina et al. | |
| 2019/0092247 A1* | 3/2019 | Dabel | B60N 3/083 |
| 2019/0291528 A1 | 9/2019 | Pajevic et al. | |
| 2022/0171402 A1* | 6/2022 | Namiki | B60L 53/16 |

FOREIGN PATENT DOCUMENTS

| | | |
|---|---|---|
| CN | 206984127 U | 2/2018 |
| CN | 208515719 U | 2/2019 |
| CN | 110104070 A | 8/2019 |
| KR | 20190033680 A | 4/2019 |

OTHER PUBLICATIONS

Written Opinion for PCT Application No. PCT/EP2020/087923, issued Apr. 13, 2021, (8 pages).
International Preliminary Report on Patentability for PCT Application No. PCT/EP2020/087923, issued Jul. 12, 2022, (9 pages).
MIR 100 User Guide. Mobile Industrial Robots A/S. Odense, S0. (Aug. 2018). V. 1.1, (pp. 1-42), 44 pages.
MIR 100 User Guide. Mobile Industrial Robots A/S. Odense, S0. (Nov. 2017). V. 1.0, (pp. 1-37), 39 pages.
MIR Fleet Reference Guide. Mobile Industrial Robots A/S. Odense, S0. (Jan. 2017). V. 1.0, (pp. 1-30), 32 pages.
EP Communication pursuant to Article 94(3) EPC mailed Mar. 4, 2022, for Application No. EP20151039.3. 8 pages.
Extended European Search Report mailed Jul. 17, 2020, for Applicaiton No. EP20151039.3. 8 pages.

* cited by examiner

CHASSIS FOR AN AUTONOMOUS MOBILE ROBOT

CROSS-REFERENCE TO RELATED APPLICATIONS

This application is a U.S. national stage entry of PCT Application No. PCT/EP2020/087923, which was filed on Dec. 28, 2020. PCT Application No. PCT/EP2020/087923 claims priority to European Patent Application No. EP20151039.3, which was filed on Jan. 9, 2020. This application claims priority to PCT Application No. PCT/EP2020/087923 and to European Patent Application No. EP20151039.3. The contents of PCT/EP2020/087923 and European Patent Application No. EP20151039.3 are incorporated herein by reference.

FIELD OF THE INVENTION

The present invention relates to a wheeled mobile robot configurable for different applications including transportation of goods loaded on top of the mobile robot, cart pulling or automated hauling of materials indoors. More specifically the present invention relates to chassis of an autonomous mobile robot for industrial transport applications.

BACKGROUND OF THE INVENTION

The efficient transportation of articles within a structure or between multiple structures is an ongoing challenge. Many transportation options exist today as commercially available products, for example conveyer belts, pneumatic tubes, gimbled carts, automatic guided vehicles. In later years autonomous mobile robots, e.g. vehicles that have been equipped with a drive system under computer control which allows autonomous guidance between two locations, have become commercially available transport solutions.

Common autonomous mobile robots (AMR) for transportation of loads comprise a chassis upon which the entire robot is built. Usually the chassis comprises a support frame, one or several drive wheels, and one or several supporting wheels attached to the chassis. Electrical and electronic equipment (EEE) parts of a mobile robot are typically attached to the chassis and may comprise a battery, a charger equipment, a communication equipment, sensors, light indicators and control equipment for navigation and safety purposes.

In most cases of autonomous mobile robots, a housing covers most of its components including EEE parts. Means for carrying a payload and/or means for hauling a cart and/or means manipulating items can be attached to the AMR and are usually located outside the housing and supported by the chassis.

For industrial applications of AMRs, it is important that the robot is robust, safe and reliable. The many EEE devices to be carried by the robot must be well protected while still serviceable/exchangeable. For an AMR it is particularly important that the sensors for navigation and safety purposes as well as the drive wheels are placed and kept in accurate positions during many hours of operation in order to provide reliable feed back to the safety and navigation systems, respectively. Drive systems on an AMR are typically equipped with odometrical systems providing the navigation systems of the AMR with displacement inputs. In order to secure that the odometrical system provides reliable input to the navigation system it is important that the drive wheels are kept in a stable position relative to the chassis of the AMR.

The transport AMR must be compact and be able to carry relatively heavy loads and/or additional modules during many hours of operation on hard surface. Further the mobile robots must be suitable for industrial mass production.

To design and manufacture AMRs specifically for each possible application is not cost efficient. It is desirable to manufacture basic mobile robot platform allowing different types of application specific top modules to be mounted on top of the basic mobile robot.

A further requirement is that EEE, which can develop heat, e.g. power boards, is mounted in a way allowing heat to be led away from the individual EEE without overheating other EEE parts.

As the AMRs for industrial applications as such are heavy, and the removing of additional payload outside designated loading/unloading areas can be challenging, the compartments for EEE must be easy to access for maintenance and/or exchange of the EEE devices, preferably without removing equipment and/or payload on top of the mobile robot and preferably without having to lifting the AMR or to turning it upside down.

In order to ensure a precise and stable location and a reliable performance of navigation and safety sensors, it is important that the chassis is manufactured with precise dimensions and that the chassis is stable and rigid even under heavy loads and while moving over uneven surfaces.

An example of a mobile robot is disclosed in a U.S. patent application Ser. No. 10/433,434 (publication No. US20040093650). The application discloses a mobile robot system for performing a plurality of separate operations comprising at least one autonomous wheeled mobile robot having at least one wheel-driving motor, an on-board computer; means for navigation, orientation, and manoeuvring in an environment with moving obstacles; a sensor system; and a wireless communication system for receiving and sending signals. The mobile robot system is useful for hauling materials on a variety of carts or wagons using a coupling hitch hook bar as cart attaching mechanism.

An example of a chassis for an AMR is disclosed in the Chinese patent application No. 201710476078.4 (publication No. CN107235092). The frame of the chassis is assembled from plate elements delimiting and covering space for EEE components.

Another example of a chassis for an AMR is disclosed in a Chinese patent application No. 201821097916.3 (publication No. CN208515719).

US 2012/023887 describes a robotic mower housing that includes a one piece molded bottom chassis having an inner wall and an outer wall. A top cover is removably attached to and covers the bottom chassis. An outer seal is provided between the outer wall of the bottom chassis and the top cover, and an inner seal between the inner wall of the bottom chassis and the top cover.

While the prior art examples fulfil basic requirements for an AMR, they do not provide a rigid chassis construction, which is able to carry heavy loads, while securing a precise position of safety and navigation sensors during many hours of industrial operation, and where the chassis at the same time is providing a protective and maintenance friendly accommodation for EEE parts for the AMR.

The object of the present invention is to overcome at least the above mentioned disadvantages of prior AMR constructions and bring additional advantages as described in the detailed description of the invention.

SUMMARY OF THE INVENTION

The present invention overcomes the shortcomings of prior art by providing an improved chassis for an AMR, where the chassis comprises a moulded frame, which is comprising a central compartment defined by a bottom part and at least two vertical sidewalls. The bottom part of the moulded frame is adapted to be supported by drive wheels and support wheels. The moulded frame further comprises horizontal shelfs protruding from the outside of the side walls at a level below the top of the sidewalls. Further the moulded frame comprises support elements protruding from the outside of the corners of the central compartment. The chassis further comprises a horizontal top cover attached to the top of the side walls of the moulded.

The top cover is improving the rigidity of the chassis and is covering the EEE within the central compartment of the frame as well as the space above the shelfs.

With this moulded frame and improved rigidity, a more precise and stable positioning of navigation and safety sensors as well as drive wheels and thereby a safer and reliable performance of the AMR is ensured. An additional important benefit of this basic chassis construction that it provides a several separated compartments and shelfs for EEE.

These EEE compartments are accessible from the sides and ends of the mobile robot by removing detachable cover parts. Hereby the EEE components are well protected against physical impact and easy to check and exchange for maintenance.

In a preferred embodiment of the invention the chassis for an autonomous mobile robot comprising a frame is a moulded frame 1 and comprises a central compartment 2 defined by two side walls 4.1, 4.2 and bottom parts 6.1, 6.2, 3.1, 3.2; outer side shelfs 7.1, 7.2 extending from outer sides of the two side walls 4.1, 4.2 at a level between bottom and top of the central compartment 2; a detachable top cover 10 mounted on top of the moulded frame 1) so that edges of the top cover 10 are substantially defining the outer periphery of the chassis.

In some implementations the moulded frame 1 further comprises inner corner supports 15.1, 15.2, 15.3, 15.4 consisting of reinforced or thicker parts of the side walls 4.1, 4.2.

In some implementations the moulded frame 1 further comprises an end wall 5.

In some implementations the moulded frame 1 further comprises inner end shelf 7.3 and an outer end shelf 7.4.

In some implementations the moulded frame 1 further comprises two arc compartments 3.1, 3.2) for drive motors M', M" arcing into central compartment 2 and rigidly interconnecting by a wall 13.

In some implementations the outer side shelfs 7.1, 7.2 are at a level above top part of the arc compartments 3.1, 3.2.

In some implementations the moulded frame 1 further comprises bottom supporting elevations 14.1, 14.2 for support of a battery shelf 7.5.

In some implementations the moulded frame 1 further comprises two first end arc compartments 8.1, 8.2 for first two support wheels and two second end arc compartments 8.3, 8.4 for second two support wheels at the bottom corners of the moulded frame.

In some implementations the outer side shelfs 7.1, 7.2 comprises supports 17.1, 17.2, 17.3 extending into the shelfs 7.1, 7.2.

In some implementations the side shelfs 7.1, 7.2, end shelfs 7.3, 7.4 and the battery shelf 7.5 are covered with detachable covers 20.1, 20.2, 20.3, 20.4, 10.

In some implementations the chassis further comprises means 11.1, 11.2 for attaching drive means 12.1, 12.2 to the bottom of the chassis' frame 1.

In some implementations the moulded frame 1 is made of aluminium.

In some implementations the moulded frame 1 is made of plastic.

In some implementations the moulded frame 1 is configured for direct attachment of EEE components to the moulded frame 1.

In some implementations the moulded frame 1 comprises supports 9.1, 9.2 protruding from the outside of the corners of the central compartment 2 for supporting navigation and/or safety sensors.

In some implementations the moulded frame 1 comprises docking elements 23.1, 23.2 protruding to an end of the of the autonomous mobile robots, where the docking elements are adapted to be interconnected with a stationary docking station in order to ensure a precise docking.

Additional benefits of the invention are described in the detailed description of the invention.

BRIEF DESCRIPTION OF DRAWINGS

Features of the invention believed to be novel and inventive are set forth with particularity in the appended claims. The invention itself, however, may be best understood by reference to the following detailed description of the invention, which describes exemplary embodiments, given in non-restrictive examples, of the invention, taken in conjunction with the accompanying drawings, in which:

Figure 1:
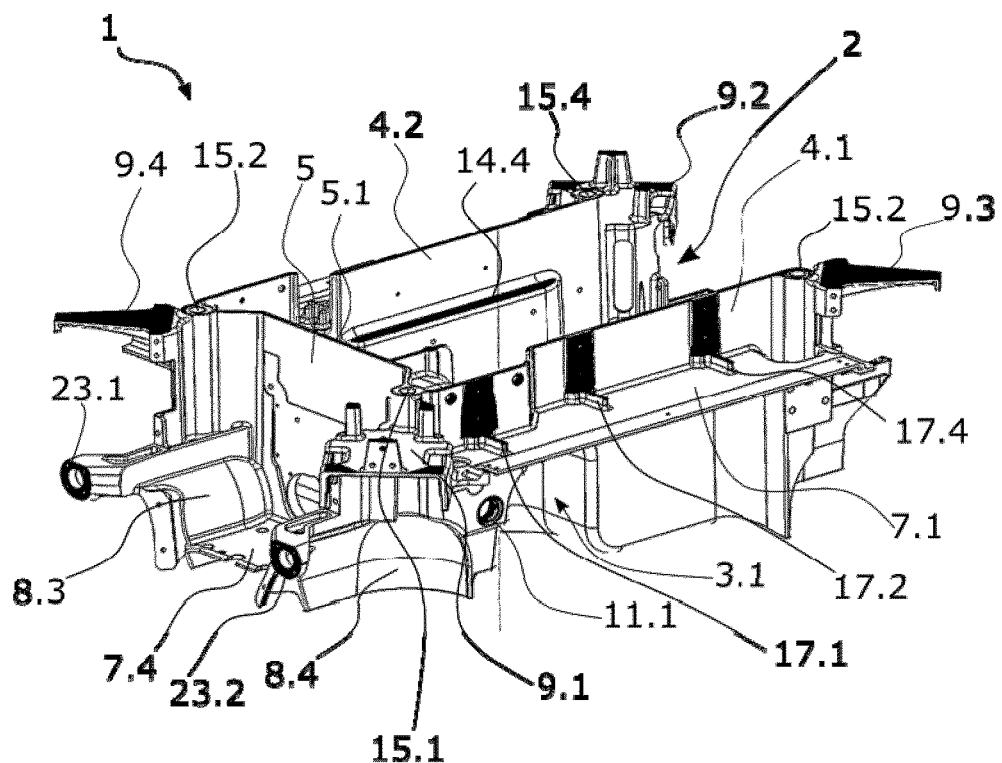
FIG. 1-3 show different views of the moulded frame according to one embodiment of the invention.

Preferred embodiments of the invention will be described herein below with reference to the drawings. Each figure contains the same numbering for the same or equivalent element.

DETAILED DESCRIPTION OF THE INVENTION

It should be understood that numerous specific details are presented in order to provide a complete and comprehensible description of the invention embodiment. However, the person skilled in art will understand that the embodiment examples do not limit the application of the invention which can be implemented without these specific instructions.

Well-known methods, procedures and components have not been described in detail for the embodiment to avoid misleading. Furthermore, this description should not be considered to be constraining the invention to given embodiment examples but only as one of possible implementations of the invention.

Referring to FIGS. 1 to 4 one embodiment of an autonomous mobile robot chassis comprises a moulded frame 1 comprising a central compartment 2 defined by bottom members 6.1, 6.2, 3.1, 3.2, two side walls 4.1, 4.2 and an end wall 5; outer side shelfs 7.1, 7.2 extending between the outer sides of the two side walls 4.1, 4.2 and the periphery of the chassis at a level below the top edge 4.11, 4.12 of side walls 4.1, 4.2; end shelfs 7.3, 7.4; battery shelf 7.5; supports 9.1, 9.2 for proximity scanners as well as for bumper plates 18.1, 18.2 at first outermost opposing corners of the chassis frame 1; supports 9.3, 9.4 at second outermost opposing corners of the moulded frame 1 for supporting bumper plates 18.3, 18.4. The sidewalls 4.1, 4.2 comprise reinforced/thicker parts at the corners of the central departments thereby providing corner supports 15.1, 15.2, 15.3, 15.4 for supporting a top cover 10 detachably mountable on top of the moulded frame 1.

Figure 4:
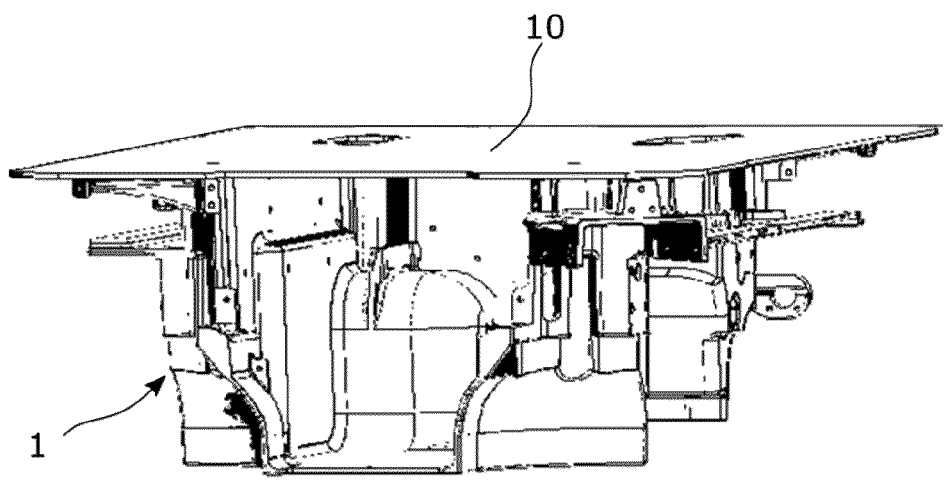
FIG. 4 shows an isometric view of chassis with mounted top cover according to one embodiment of the invention.

Referring to FIG. 4 a top cover 10 can be secured to the moulded frame 1 via corner supports 15.1, 15.2, 15.3, 15.4 using bolts or other suitable fastening means.

Figure 5:
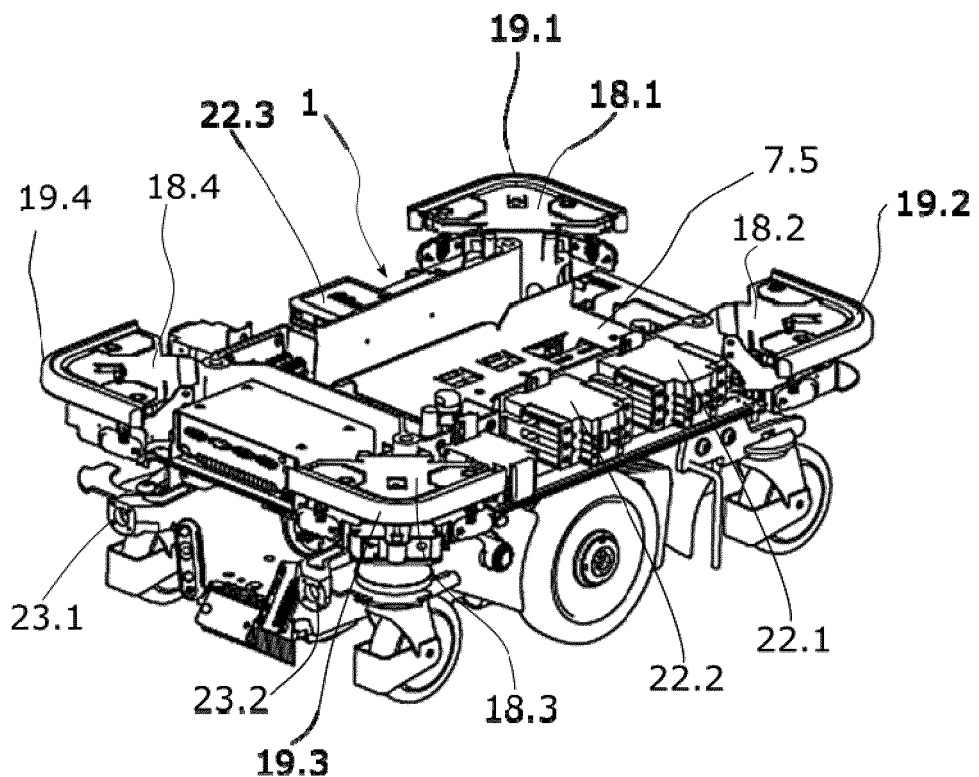
FIG. 5 shows an isometric view of chassis with mounted side bumpers and a battery shelf according to one embodiment of the invention.
Figure 6:
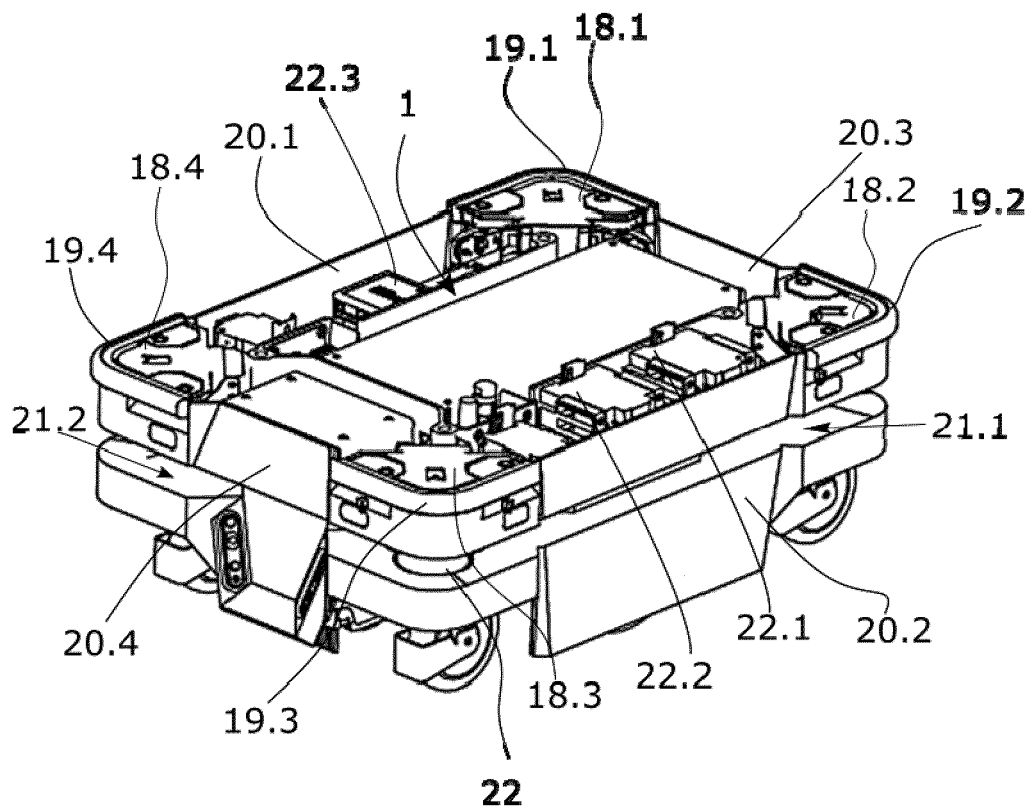
FIG. 6 shows an isometric view of chassis with mounted side and end covers according to one embodiment of the invention.
Figure 7:
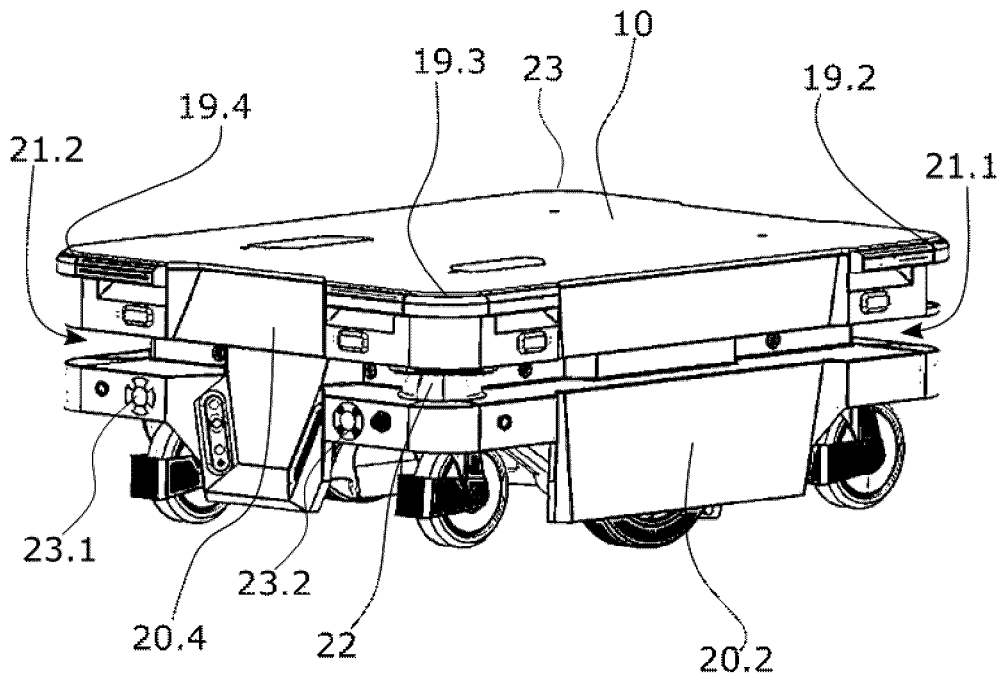
FIG. 7 shows an isometric view of chassis with mounted side, end and top covers according to one embodiment of the invention.

Referring to FIG. 1, FIG. 5 and FIG. 6 the moulded frame comprises docking elements 23.1, 23.2 protruding to an end of the AMR. The docking elements 23.1, 23.2 are designed to fit with (not shown) counter parts of a (not shown) stationary docking station in order to ensure a precise docking of the AMR. The docking elements 23.1, 23.2, and/or its (not shown) stationary counter parts can be equipped with locking elements in order to ensure a precise and reliable position of the AMR during the docking, while per example loading or unloading the AMR or while a manipulator attached to the AMR is performing a precise operation.

Referring to FIG. 5, a set of bumper plates 18.1, 18.2, 18.3, 18.4 are provided with bumper elements 19.1, 19.2, 19.3, 19.4 for absorbing impact energy. In the illustrated example EEE parts 22.1, 22.2 and 22.3 are mounted on side shelf 7.1 and side shelf 7.2, respectively.

The top cover 10 may for example be a detachably attached plate, hood or a module. The top cover 10 in the form of a plate is preferably made of steel or other material having similar mechanical properties. The top plate 10 is designed to withstand high deformation forces along its entire surface. There further may be a connecting element between moulded frame 1 and a module mounted on top of the chassis of the AMR. The top module may be, but is not limited to an attaching mechanism for coupling the mobile robot to a cart or a wheeled inventory holder; a manipulator such as a robotic arm; a lifting mechanism, such as a pallet lifter; a conveyor for loading and/or unloading items.

Figure 8:
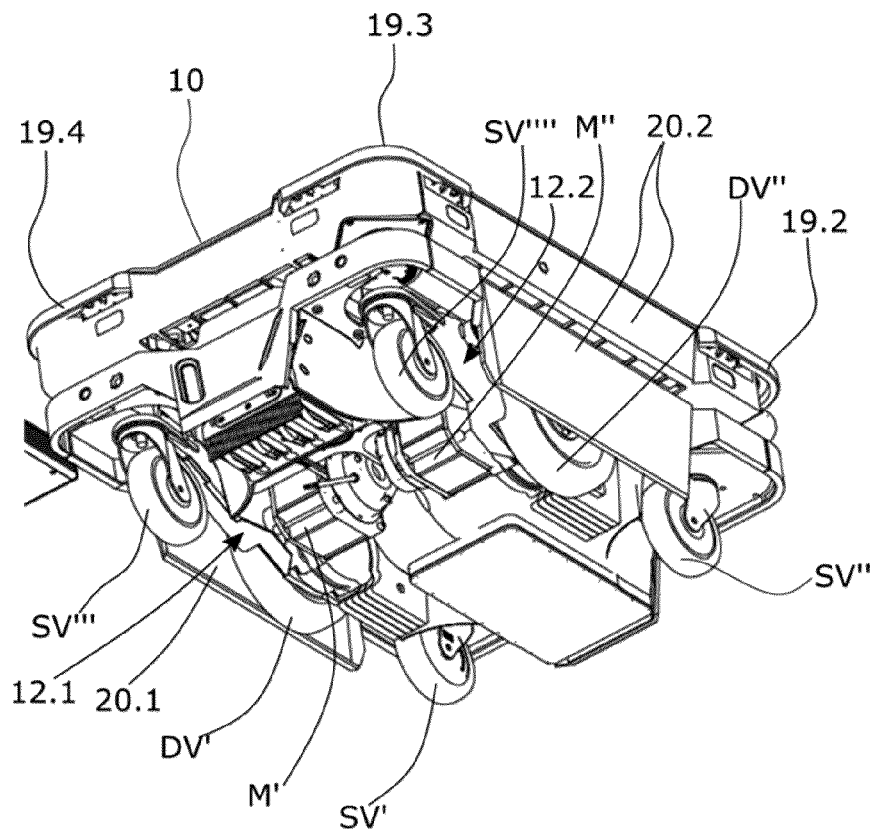
FIG. 8 shows an isometric view of chassis underside with drive means mounted thereto according to one embodiment of the invention.

Referring to FIG. 8, the moulded frame 1 of the example embodiment comprises first end arc compartments 8.1, 8.2 for accommodating first end support wheels SV', SV" and second end arc compartments 8.3, 8.4 for accommodating second end support wheels SV''', SV''''. Referring to FIG. 1 and FIG. 8. the moulded frame 1 according to the example embodiment comprises means 11.1, 11.2 for attaching drive means 12.1, 12.2 to the bottom of the chassis' frame 1.

The bottom part in the example embodiment of the moulded frame comprises two arc compartments 3.1, 3.2 arcing into a central compartment 2 for motors M', M", where the bottom parts 6.1, 6.2 are extending from the arc compartments 3.1, 3.2 to a first and a second end of the central compartment 2, respectively.

The outer side shelfs 7.1, 7.2 in the illustrated embodiment extend between the outer sides of the two side walls 4.1, 4.2 and the periphery of the chassis and at a level above top part of the arc compartments 3.1, 3.2. In other embodiments the side shelf may be a shorter protrusion, which contributes to the rigidity of the moulded frame 1, and still provides a support for EEE.

The means for attaching drive means are in the illustrated example embodiment openings 11.1, 11.2 for accommodating swivel shafts of each side drives 12.1, 12.2. The swivel shaft is in this example common to both side drives 12.1, 12.2 and extends from one sidewall opening 11.1 to the other sidewall opening 11.2 through the central compartment 2 of the moulded frame 1, between the end wall 5 and two arc compartments 3.1, 3.2 for motors M', M".

In the illustrated embodiment the side drives comprise a support wheel S and a drive wheel DV mounted on a common support body SB, and a swivel shaft support chamber to pass the swivel shaft through it. It further comprises an electric motor M and a gearbox. All are mounted on the common support body SB.

In the example embodiment the side shelfs 7.1, 7.2 and end shelfs 7.3, 7.4 are accessible from the sides and ends, respectively by removing detachable cover parts 20.1, 20.2, 20.3, 20.4. The battery shelf 7.5 being located in the central compartment 2 is resting on at least parts of the shelf supports 14.1, 14.2, 14.3, 14.4 and is accessible from one end of the central compartment 2. The battery rests on the central horizontal part of the battery shelf 7.5 and fits between vertical parts of the edges of the battery shelf 7.5. Hereby the EEE components are well protected against physical impact and easy to check and exchange for maintenance.

The moulded frame 1 is preferably made of aluminium or similar material per example plastic ensuring light weight, durability and rigidity of the frame. The material is preferably a casting material.

Optionally various EEE components (not shown) are attached directly to the moulded frame 1 in a way that leads any access heat away from the EEE. Optionally various EEE components as per example power boards and/or motor controllers (not shown) are attached via intermediate connecting elements, as per example heat leading pasta, to the moulded frame 1 in a way that leads any access heat away from the EEE.

Figure 2:
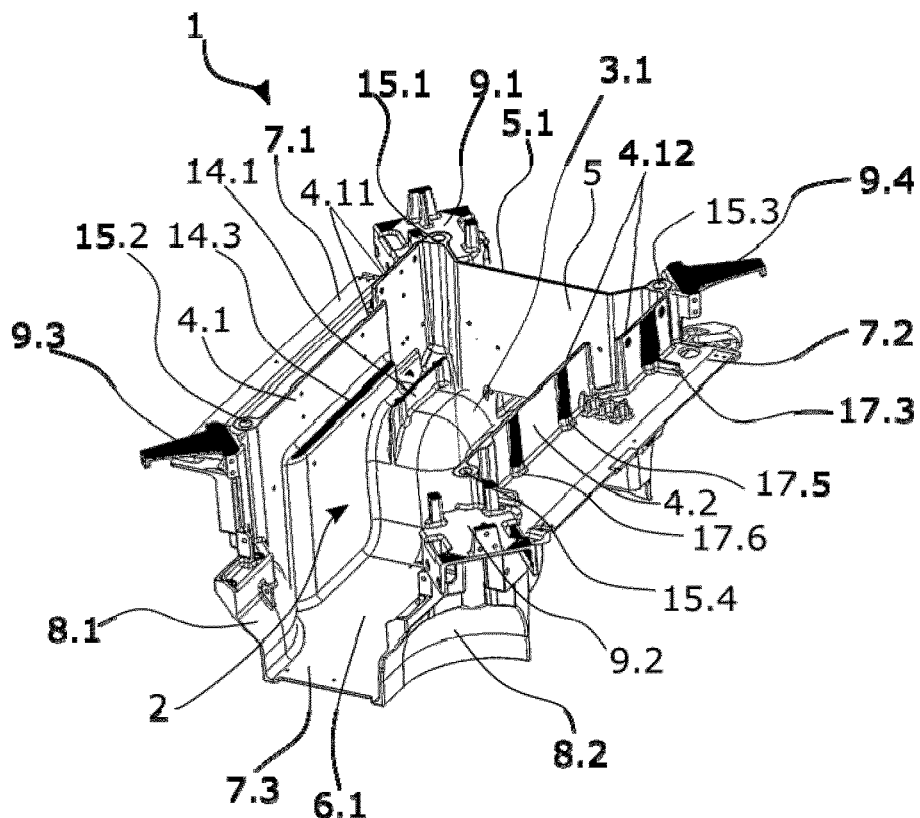
Figure 3:
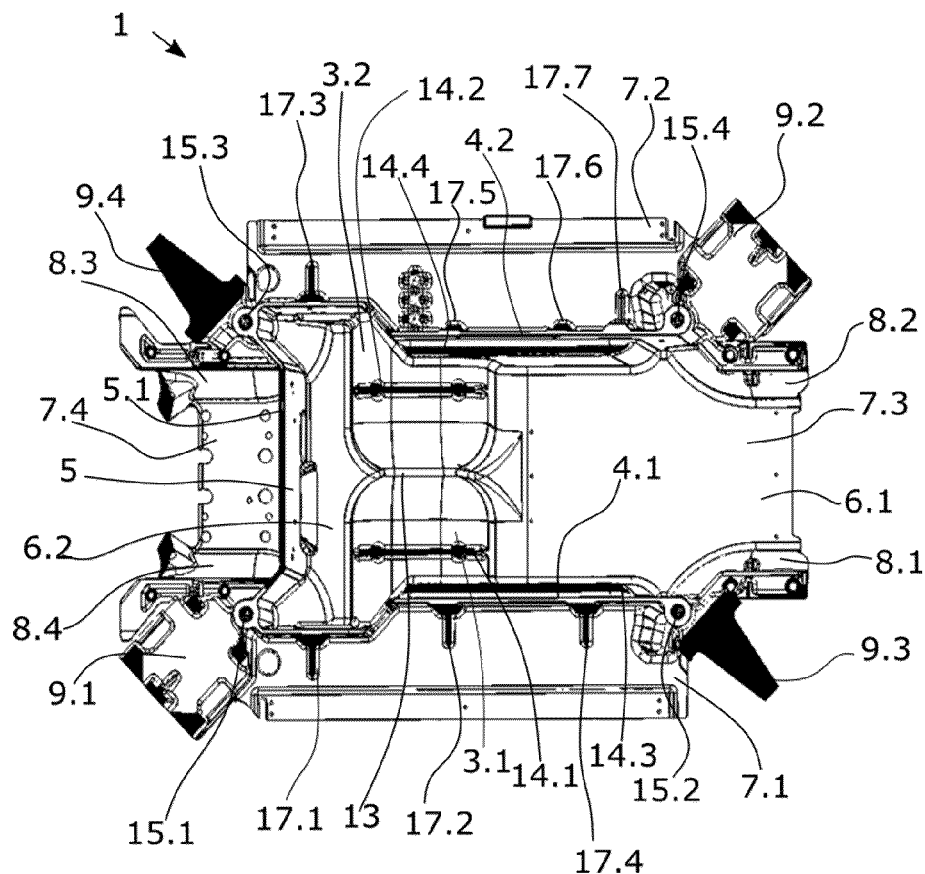

Referring to FIGS. 1 to 3 the frame 1 of the example embodiment comprises corner supports 15.1, 15.2, 15.3, 15.4. which are extending from first end arc compartments 8.1, 8.2 for accommodating first end support wheels SV', SV' and from second end arc compartments 8.3, 8.4 for accommodating second end support wheels SV''', SV'''' up to top edge 4.11, 4.12 of side walls 4.1, 4.2 and top edge 5.1 of end wall 5. The corner supports 15.1, 15.2, 15.3, 15.4 increases frame 1 resistance to downwards deformation forces as well as increases rigidity of protruding proximity sensors' supports 9.1, 9.2 which protrudes from opposing corners of the frame 1.

In the example embodiment the end wall 5 extends from bottom part 6.2 and between two corner supports 15.1, 15.2 of one end and up to the top edge 5.1 of the corner supports 15.1, 15.2, and thereby further is improving structural stability and rigidity of the frame 1.

The side walls 4.1, 4.2 each extend from bottom parts 6.1, 6.2, 3.1, 3.2 between respective corner supports 15.1, 15.2, 15.3, 15.4 and up to the top edges 4.11, 4.12 of the respective corner supports 15.1, 15.2, 15.3, 15.4. The side walls contribute to structural stability and rigidity of the frame 1 and provide a large central compartment 2 for containing EEE elements as per example a battery.

The concave compartments 3.1, 3.2 are allowing the drive wheel motors M', M" to substantially protrude into the inner space of the moulded frame 1, thus lowering the centre of weight of the chassis. The concave compartments 3.1, 3.2 further improve structural stability and rigidity by interconnecting at a common wall 13 and forming a support between the sidewalls 4.1, 4.2.

In some embodiments the outer side shelfs 7.1, 7.2 comprises supports 17.1, 17.2, 17.3 extending into the shelfs 7.1, 7.2.

In some embodiments one end shelf 7.3 delimits the central compartment 2 and is a bottom part of the central compartment 2, and another end shelf 7.4 extend from the end wall 5 to the periphery of the chassis.

The top cover 10 is substantially covering the central compartment 2 as well as the space above the side and end shelfs 7.1, 7.2, 7.3, 7.4.

Commonly to all embodiments the frame 1 further comprises supporting elevations 14.1, 14.2 for supporting the battery shelf 7.5 from underneath. The supporting elevations 14.1, 14.2 are for example protruding from tops of both two arc compartments 3.1, 3.2 for motors M', M".

Preferably the side covers 20.1, 20.2 and end covers 20.3, 20.4 are provided with a longitudinal gap 21.1, 21.2, 21.3, 21.4 for the proximity sensor 22, 23 view field. Each of the longitudinal gaps 21.1, 21.3 on both sides are arranged in the same way. Each of the longitudinal gaps 21.2, 21.4 on both ends are arranged in the same way. In such a way the proximity sensors 22, 23 have a view field of 270 degrees each along the longitudinal gaps 21.1, 21.2, 21.3, 21.4.

The proximity sensors' supports 9.1, 9.2 at opposing corners of the chassis frame 1 are such that ensure rigid and accurate mounting of proximity sensors such as 270 degree of observation ultrasonic safety scanners. Further the proximity sensors' supports 9.1, 9.2 are mounted at each of the supports 9.1, 9.2 so that would have at least 270-degree unobstructed field of visibility.

Preferably all parts of the moulded frame 1 forms a single moulded body.

Although numerous characteristics and advantages together with structural details and features have been listed in the present description of the invention, the description is provided as an example fulfilment of the invention. Without departing from the principles of the invention, there may be changes in the details, especially in the form, size and layout, in accordance with most widely understood meanings of the concepts and definitions used in claims.

The invention claimed is:

1. A chassis for an autonomous mobile robot, the chassis comprising:
    a molded frame comprising a central compartment defined by side walls, an inner end shelf, an outer end shelf, a battery shelf, and bottom supporting elements for supporting the battery shelf;
    outer side shelves extending from outer sides of the side walls at a level between a bottom and a top of the central compartment;
    a detachable top cover mounted on top of the molded frame, where the detachable top cover covers the central compartment and a space above the outer side shelves, and where edges of the detachable top cover substantially define an outer periphery of the chassis; and
    detachable covers that respectively cover areas of the outer side shelves, the inner and outer end shelves, and the battery shelf.

2. The chassis of claim 1, where the molded frame further comprises inner corner supports comprised of reinforced or thickened parts of the side walls.

3. The chassis of claim 1, where the molded frame comprises an end wall.

4. The chassis of claim 1, where the molded frame comprises arc compartments for drive motors, the arc compartments arcing into the central compartment and being rigidly interconnected by a wall.

5. The chassis of claim 4, where the outer side shelves are at a level above a top part of the arc compartments.

6. The chassis of claim 1, where the molded frame further comprises first end arc compartments for first support wheels and second end arc compartments for second support wheels at bottom corners of the molded frame.

7. The chassis of claim 1, where the outer side shelves comprise supports extending into the outer side shelves.

8. The chassis of claim 1, further comprising means for attaching swivel shafts of supportive drive means to a bottom of the molded frame.

9. The chassis of claim 1, where the molded frame comprises aluminum.

10. The chassis of claim 1, where the molded frame comprises plastic.

11. The chassis of claim 1, where the molded frame is configured for direct attachment of electrical and electronic components to the molded frame.

12. The chassis of claim 1, where the molded frame comprises supports protruding from outside of the corners of the central compartment for supporting at least one of a navigation sensor or a safety sensor.

13. The chassis of claim 1, where the molded frame comprises docking elements protruding to an end of the autonomous mobile robot, where the docking elements are adapted to be interconnected with a stationary docking station.

14. An autonomous mobile robot comprising:
    the chassis of claim 1;
    wherein the detachable top cover is mounted at a top of the chassis; and
    a connecting element between the molded frame and a module.

15. The autonomous mobile robot of claim 14, wherein the molded frame comprises the detachable covers that cover the outer side shelves, the inner and outer end shelves, and the battery shelf.

* * * * *